United States Patent [19]
Hattori et al.

[11] Patent Number: 5,157,974
[45] Date of Patent: Oct. 27, 1992

[54] FLUIDIC FLOWMETER

[75] Inventors: Tatsuo Hattori, Chiba; Takashi Ueki; Katsuhito Sakai, both of Tokyo; Toshiki Ishikawa, Tachikawa; Yukihiro Niimi, Nagoya, all of Japan

[73] Assignee: Tokyo Gas Company, Limited, Tokyo, Japan

[21] Appl. No.: 719,802

[22] Filed: Jun. 24, 1991

[30] Foreign Application Priority Data

Jun. 27, 1990 [JP] Japan ................................. 2-168767

[51] Int. Cl.⁵ .............................................. G01F 1/32
[52] U.S. Cl. .............................................. 73/861.19
[58] Field of Search ............... 73/198, 861.19; 137/37, 137/39

[56] References Cited

U.S. PATENT DOCUMENTS

| | | | |
|---|---|---|---|
| 3,950,990 | 4/1976 | Butcher | 73/253 |
| 4,270,577 | 6/1981 | Brown et al. | 73/198 |
| 4,280,360 | 7/1981 | Kobayashi et al. | 73/198 |
| 4,841,781 | 6/1989 | Khalifa | 73/861.22 |
| 5,003,810 | 4/1991 | Jepson et al. | 73/861.19 |

*Primary Examiner*—Herbert Goldstein
*Attorney, Agent, or Firm*—McGlew & Tuttle

[57] ABSTRACT

The flowrate of fluid to be measured, that flows into the nozzle of a fluidic oscillator is stabilized by fitting flow adjusting plates on the upstream side of the nozzle.

7 Claims, 2 Drawing Sheets

△ - Without the flow adjusting plate

X - With the flow adjusting plate ( Embodiment )

FLUIDIC FLOWMETER

FIELD AND BACKGROUND OF THE INVENTION

This invention relates to the fluidic flowmeter for measuring the flowrate of natural gas provided to a household and other gases.

The fluidic flowmeter is a flowmeter for measuring the flowrate by structuring a adhesion wall and a feedback flow channel on a downstream side of a nozzle from which the fluid to be measured is blown out, generating a fluid vibration relative to the adhesions wall while utilizing the Coanda effect with the pressure propagation being transmitted to the feed back flow channel, and by designing the said fluid vibration (oscillation frequency) to be proportional to the fluid measured.

As the fluidic flowmeter with this type of structure, the flowmeters described in U.S. Pat. No. 3,640,133, U.S. Pat. No. 3,690,171, Japan Patent Official Disclosure No. 48-54962, Japan Patent Official Disclosure No. 53-77558, Japan Patent Official Disclosure No. 59-184822, etc. are already known to the public.

Because this fluidic flowmeter functions to blow out the measured fluid from the nozzle as described above for generating the fluid vibration, the flowrate of measured fluid being blown out of this nozzle must be stable in proportion to the flowrate as its essential condition, and a measurement error occurs if the flowmeter lacks such stability.

The flowrate of a fluid being blown out of the nozzle is governed greatly by the shape on an upstream side of the nozzle together with the shape of nozzle. For example, if there should be anything hindering the smooth flow in the flow channel on the upstream side of nozzle, a vortex flow appears to the fluid flowing into the nozzle, and this vortex flow exerts a great influence on the flowrate by a change in flowrate.

Therefore, as it can be understood from the aforesaid officially known fluidic flowmeters, that a straight flow channel is formed on the upstream side of the nozzle for making vortex flow unlikely.

Forming a straight flow channel on the upstream side of nozzle in this way is possible in a staged experiment room or at wide installation conditions. However, if a compact size is required from the installation condition like the gas meter of gas being supplied to general households, for example, through piping, it is impossible to form a sufficient straight flow channel on the upstream side of nozzle. Moreover, in the case of this type of gas meter, the valves and governors are frequently installed on the upstream side of the nozzle, and there also exist bends of piping or the land, offset by joints, all of which become factors causing vortex flow in the gas flow and exerting influence on the stability of the flowrate

SUMMARY AND OBJECTS OF THE INVENTION

It is an object of this invention to provide a flowmeter having means for stabilizing the flowrate of measured fluid that flows into the nozzle.

According to the invention, a fluidic flowmeter is provided including a nozzle inlet and flow adjusting plate for guiding fluid flow of a measured fluid to the nozzle inlet. The flow adjusting plate is provided at an upstream side of the nozzle inlet. The flow adjusting plate is preferably provided in a channel which is provided in a compact case and which preferably has a bend providing a reverse in direction. The flow adjusting plate is of an elbow shape installed in the flow channel for directing fluid flow into the nozzle inlet from a side direction. The fluidic flowmeter provided having an inlet extending in a flow direction and having an outlet extending to the nozzle inlet includes a split flow channel for dividing the flow of the measured fluid in the interior of the adjusting plate.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
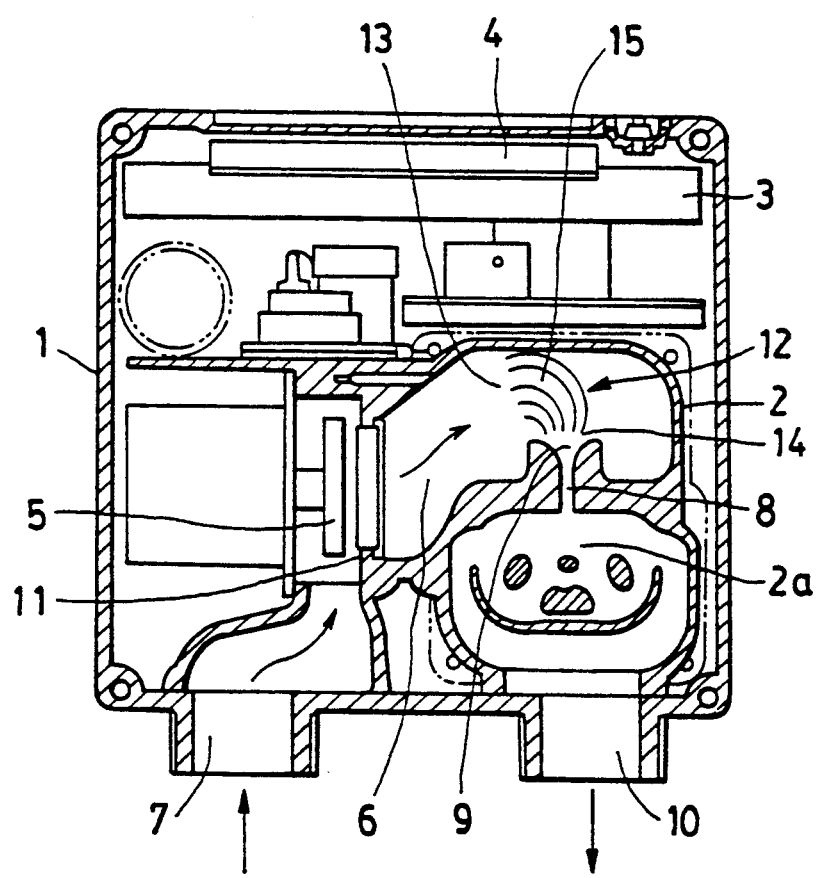
FIG. 1 is an explanatory drawing of fluidic flowmeter according to the invention.

Referring to the drawings and in particular to FIG. 1, the fluidic flowmeter with a housing case 1 of the present invention is shown. This flowmeter has such a construction including a fluidic element 2 built into the case 1. Additionally an operation circuit 3, for operating the flowrate on the basis of the fluid signal from the said fluidic element 2 is also provided. A display portion 4 and an emergency shut-off valve 5 are also incorporated into the case 1.

A gas flow channel 6 is provided leading to the nozzle inlet 9 of nozzle 8 of aforesaid fluidic element 2 from the gas inlet 7 installed to the bottom portion of case 1. This gas flow channel 6 is approximately U-turned or reversed in direction inside the case 1 to lead to the nozzle inlet 9 and reaches the gas outlet 10 installed to the bottom portion of case 1 after passing through the fluid vibration generating chamber 2a inside the fluidic element 2.

A valve seat 11 is formed in the gas flow channel 6. The aforementioned emergency shut-off valve 5 closes this valve seat 11 for shutting off the flow inside the gas flow channel 6.

A flow adjusting plate arrangement 12 is provided that is installed to the portion of gas flow channel 6 leading to this nozzle inlet 9 from the left side direction of nozzle inlet 9, and this flow adjusting plate 12 has an elbow shape with its inlet 13 being directed to the upstream side and its outlet 14 bordering on the nozzle inlet 9. The plate arrangement 12 has the construction for forming split flow channels 15 by dividing its interior into plural sections. For reference, the split flow channels 15 need not be formed inside the flow adjusting plate 12, but it may also be a trumpet tube leading to the outlet 14 which is throttled radially from the area of inlet 13.

In the said fluidic flowmeter, the gas inflow from the gas inlet 7 enters into the inlet 13 of flow adjusting plate 12 via the valve seat 11 inside the gas flow channel 6, reaches the outlet 14 via the split flow channels 15 inside the flow adjusting plate 12 and flows out into the fluid vibration generating chamber 2a via the nozzle 8 from the nozzle inlet 9.

The fluid vibration generated inside the fluid vibration generating chamber 2a is converted into an electric signal for its input into the operation circuit 3, wherein the flowrate is operated and its integrated value is indicated on the display portion 4.

Because this invention smoothly guides the flow of gas flowing into the nozzle inlet 9 by the flow adjusting plate 12 as described above, the fluid is adjusted in its flow while passing through the interior of flow adjusting plate 12 and smoothly flows into the nozzle inlet 9 even if vortex flow should be generated by the shape of flow channel on the upstream side of nozzle inlet 9 or by the presence of emergency shut-off valve 5, valve seat 11, etc.

Figure 2:
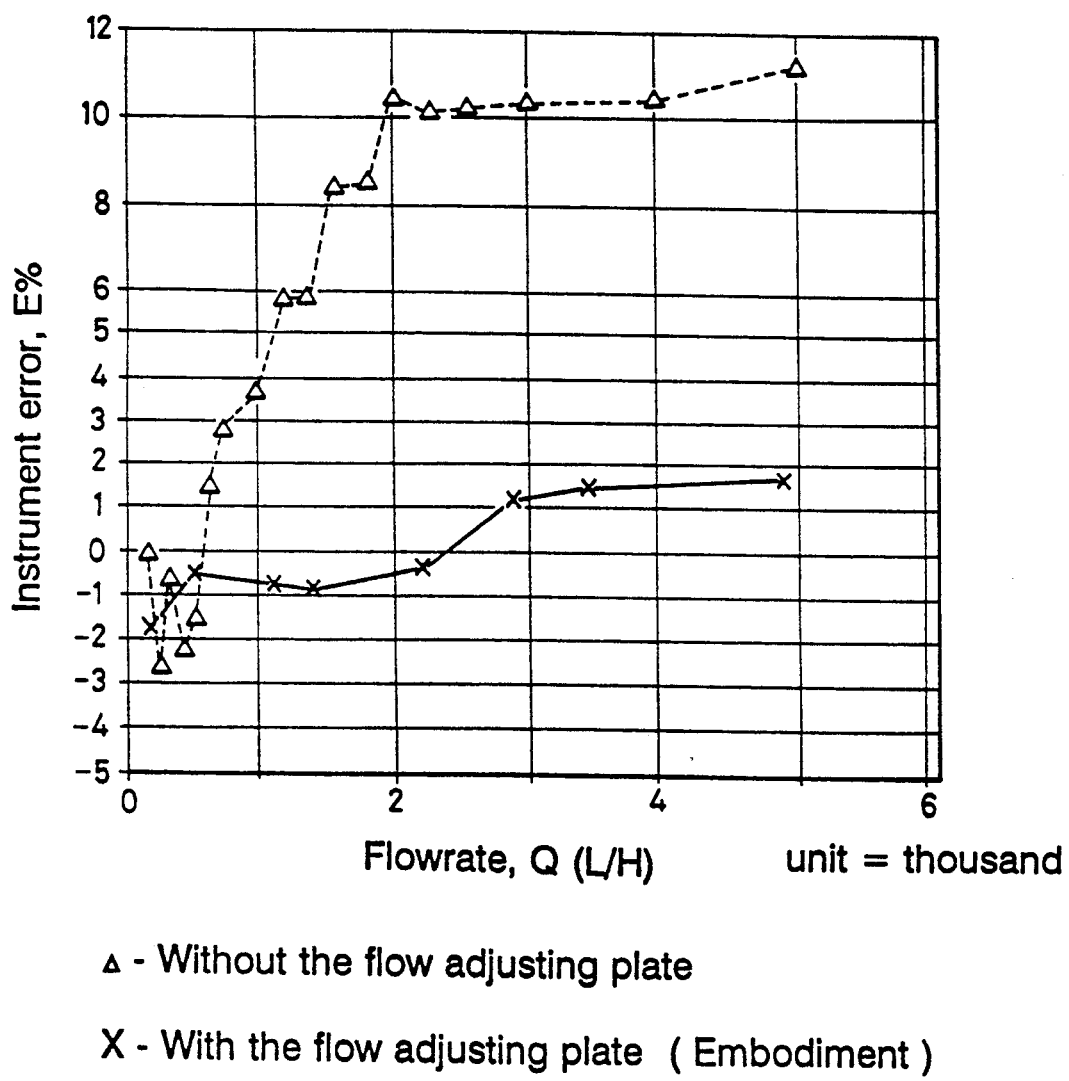
FIG. 2 is an explanatory graph comparing instrument error performances in the cases that the flow adjusting plate has been installed and the case that the plate has not been installed.

Consequently, the flowrate becomes stable and the instrument error performance can be suppressed to less than $+/-2\%$ as shown in FIG. 2 in all the flowrate regions as compared with the case of not providing the flow adjusting plate 12 of the invention.

As a result, the fluidic flowmeter of the invention can be accommodated compactly into a small case 1 as shown in FIG. 1.

While a specific embodiment of the invention has been shown and described in detail to illustrate the application of the principles of the invention, it will be understood that the invention may be embodied otherwise without departing from such principles.

What is claimed is:

1. A fluidic flowmeter comprising: a flowmeter case including an inlet and an outlet providing fluid connections on a single side of said case, said inlet for passage of fluid into a said case in a first direction, and said outlet for passing fluid out of said case in a second direction, said first and second directions being substantially opposite with flow through said inlet, and said outlet being substantially parallel; a channel defined in said case, said channel being in communication with said inlet; means defining a fluid vibration generating chamber, within said case, said fluid vibration generating chamber being in communication with said outlet; a nozzle providing communication between said channel and said fluid vibration generating chamber, said nozzle having a passage extending substantially in parallel with said first and second directions, providing a nozzle flow direction; and fluid flow adjusting means including a plurality of flow adjusting plates positioned within said channel defining flow passages upstream of said nozzle inlet, said fluid flow adjusting means for redirecting fluid flow in said channel from an adjusting means inlet direction, substantially perpendicular to said nozzle flow direction, to an adjusting means outlet direction, substantially parallel to said nozzle flow direction, and for providing a uniform flow ate for fluid flowing into said nozzle from said flow passages of said adjusting means.

2. A fluidic flowmeter according to claim 1, wherein said plurality of flow adjusting plates, each plate having an elbow shape for redirecting fluid flow.

3. A fluid flowmeter according to claim 1, wherein said plurality of flow adjusting plates define a plurality of curved passages dividing flow in said channel to provide uniform flow at an outlet of said fluid flow adjusting means directly in front of said nozzle inlet.

4. A fluidic flowmeter according to claim 1, wherein a distance between adjacent said plurality of plates at a inlet side of said fluid flow adjusting means is substantially equal, and a distance between adjacent said plurality of plates at an outlet side of said fluid flow adjusting means is substantially equal.

5. A fluidic flowmeter according to claim 4, wherein said spacing at said inlet of said fluid flow adjusting means is greater than said spacing at said outlet, and of said fluid flow adjusting means.

6. A fluidic flowmeter according to claim 2, wherein each of said adjusting plates has a different length ranging from an inner shortest length to an outer longest length.

7. A fluidic flowmeter comprising: a flowmeter case including an inlet and an outlet connected to said case at a single face of said case, said inlet for passage of fluid into a said case in a first direction and said outlet for passing fluid out of said case in a second reaction, said first and second directions being substantially opposite with flow through said inlet and said outlet being substantially parallel; a channel defined in said case, said channel being in communication with said inlet; means defining a fluid vibration generating chamber, within said case, said fluid vibration generating chamber being in communication with said outlet; a nozzle providing communication between said channel and said fluid vibration generating chamber, said nozzle having a passage extending substantially in parallel with said first and second directions, providing nozzle flow direction; and fluid flow adjusting means including a plurality of flow adjusting plates positioned within said channel adjacent plates being spaced apart a first distance at an adjusting means inlet side and being spaced apart a second distance at an adjusting means outlet side, said first distance being greater than said second distance to define tapered flow passages upstream of said nozzle inlet, said fluid flow adjusting means or redirecting fluid flow in said channel from an inlet direction, substantially perpendicular to said nozzle flow direction, to an outlet direction, substantially parallel to said nozzle, and for providing uniform flow rate for fluid flowing into said nozzle; said adjusting means outlet side being positioned directly in front of said nozzle inlet.

* * * * *

UNITED STATES PATENT AND TRADEMARK OFFICE
CERTIFICATE OF CORRECTION

PATENT NO. :   5,157,974
DATED      :   October 27, 1992
INVENTOR(S) :  Hattori et al It is certified that error appears in the above-identified patent and that said Letters Patent is hereby corrected as shown below:

On the title page, correct the Assignee to read as follows:

[73]  Assignee:   Tokyo Gas Company, Limited, Tokyo, Japan
                  and Aichi Tokei Denki Co., Ltd.,
                  Aichi-Ken, Japan Signed and Sealed this Twelfth Day of October, 1993

Attest:

BRUCE LEHMAN

*Attesting Officer*         *Commissioner of Patents and Trademarks*